United States Patent [19]
Yazaki et al.

[11] Patent Number: 5,596,235
[45] Date of Patent: Jan. 21, 1997

[54] SPINDLE MOTOR WITH SEAL STRUCTURE

[75] Inventors: Asao Yazaki, Iida; Masanobu Chuta, Shiga-ken; Hiroshi Matsumoto, Hikone; Junko Satake, Mori-machi; Hiromi Iida, Kameoka; Koji Tomita, Takatsuki, all of Japan

[73] Assignee: Nidec Corporation, Kyoto, Japan

[21] Appl. No.: 198,116

[22] Filed: Feb. 17, 1994

[30] Foreign Application Priority Data

Feb. 22, 1993 [JP] Japan .................... 5-057768
Mar. 3, 1993 [JP] Japan .................... 5-042343
Mar. 4, 1993 [JP] Japan .................... 5-069341
Mar. 23, 1993 [JP] Japan .................... 5-089191

[51] Int. Cl.$^6$ ............................................. H02K 7/00
[52] U.S. Cl. ..................... 310/67 R; 310/90; 384/482
[58] Field of Search .......................... 310/67 R, 90; 360/99.08; 277/53; 384/480

[56] References Cited

U.S. PATENT DOCUMENTS

| | | | |
|---|---|---|---|
| 4,894,738 | 1/1990 | Elsasser | 360/97.1 |
| 5,227,686 | 7/1993 | Ogawa | 310/90 |
| 5,347,189 | 9/1994 | Chuta | 310/90 |
| 5,370,404 | 12/1994 | Klein | 277/153 |
| 5,402,023 | 3/1995 | Nakanishi | 310/90 |

FOREIGN PATENT DOCUMENTS

1008061  5/1959  Germany ............... 277/56

Primary Examiner—Thomas M. Dougherty
Assistant Examiner—Elvin G. Enad
Attorney, Agent, or Firm—McCormick, Paulding & Huber

[57] ABSTRACT

A spindle motor comprises a stationary shaft, a rotor hub rotatably mounted by ball bearings to the stationary shaft, and annular sealing members disposed between the outer surface of the stationary shaft and the inner side of the rotor hub axially outwardly of the ball bearings. The sealing member is directly fitted onto the outer race of the corresponding ball bearing. The outer race of each ball bearing is high precision finished so that the sealing member is definitely coaxial with the stationary shaft regardless of the finishing accuracy on the inner side of the rotor hub. Accordingly, the radial distance between the inner side of the sealing member and the outer surface of the stationary shaft can be minimized with high precision offering an excellent labyrinth effect.

6 Claims, 9 Drawing Sheets

SPINDLE MOTOR WITH SEAL STRUCTURE

FIELD OF THE INVENTION

The present invention relates to a spindle motor used for rotation of magnetic disks, optical disks, etc.

DESCRIPTION OF THE PRIOR ART

There are two types of spindle motors, a shaft stationary model and a shaft rotary model. The shaft stationary type motor comprises a stationary shaft, a hub rotatably mounted by bearings to the stationary shaft, a rotor magnet mounted to the hub, and a stator located opposite to the rotor magnet. The shaft rotary type motor comprises a stationary member, a hub rotatably mounted on the stationary member, a rotary shaft mounted to the hub, bearings mounted between the rotary shaft and the stationary member, a rotor magnet mounted to the hub, and a stator located opposite to the rotor magnet.

Such a spindle motor generally has a labyrinth sealing means or a magnetic fluid sealing means provided on the outside of the bearings for preventing impurities (e.g. drops of grease for lubrication of the bearings) inside the motor interior from escaping outwardly.

One labyrinth sealing means in a stationary type shaft spindle motor is disclosed, for example, in U.S. Pat. No. 4,894,738, as illustrated in FIG. 10. As shown, the labyrinth sealing means incorporates a staggered labyrinth construction formed by a combination of an elaborately shaped stationary sealing member fixedly mounted to the outer surface of a stationary shaft and an elaborately shaped rotary sealing member fixedly mounted directly or by bearing support rings to the inner surface of a hub.

Another example of a magnetic fluid sealing means is addressed in U.S. Pat. No. 4,894,738, in FIG. 9. The magnetic fluid sealing means shown comprises an annular mounting member and a magnetic fluid supporting means mounted to the mounting member, in which the mounting means may be secured to a hub (or a stationary member) allowing a magnetic fluid to be filled between the magnetic fluid supporting member and a stationary shaft (or a rotary shaft).

However, the spindle motor of the type described still offers some drawbacks. The labyrinth sealing means produces a path of very small gap between the stationary sealing member and the rotary sealing member of elaborate shape assembled in a combination which ensures a sealing effect if precision formed. To implement the very small gap, it is required to have the stationary and rotary sealing members fabricated with higher accuracy and more particularly, to have the outer surface of the stationary member and the inner surface of the hub finished in higher roundness and situated coaxially. If the inner surface of the hub fails to be finished with a desired precision, the very small gap will be degraded in dimensions. This causes difficulties in fabrication and assembling of the motor components.

The mounting member of the magnetic fluid sealing means is commonly bonded by adhesive to the hub (or the stationary member). If the bonding with adhesive is furnished inadequately (i.e. a lesser amount of an adhesive is applied), there is developed a minimal space between the mounting member and the hub (or the stationary member). Also, grease for the bearings commonly tends to have its oil substances liberated after a considerable length of service. As the oil substances are liberated in a motor with its mounting member poorly bonded, they begin to flow into and through the space between the mounting member and the hub (or the stationary member) and move toward recording disks which will eventually be fouled on the surfaces.

It is understood that the foregoing drawbacks are common not only in the magnetic fluid sealing means but also in the labyrinth sealing means.

SUMMARY OF THE INVENTION

It is a first object of the present invention to provide a spindle motor having a sealing member arranged coaxially of its stationary shaft at high precision and more specifically, in which the inner side of the sealing member is radially spaced by a uniform minimal distance from the outer surface of the stationary shaft, having been finished and installed at high precision and efficiency thus offering an improved labyrinth sealing means.

It is a second object of the present invention to provide a spindle motor in which undesired oil substances liberated from the grease in the ball bearings is practically prevented from leaking out of the motor.

Other objects and features of the present invention will be apparent from the following description.

DETAILED DESCRIPTION OF THE PREFERRED EMBODIMENTS

The preferred embodiments of the present invention will now be described in more detail in conjunction with the accompanying drawings.

Figure 1:
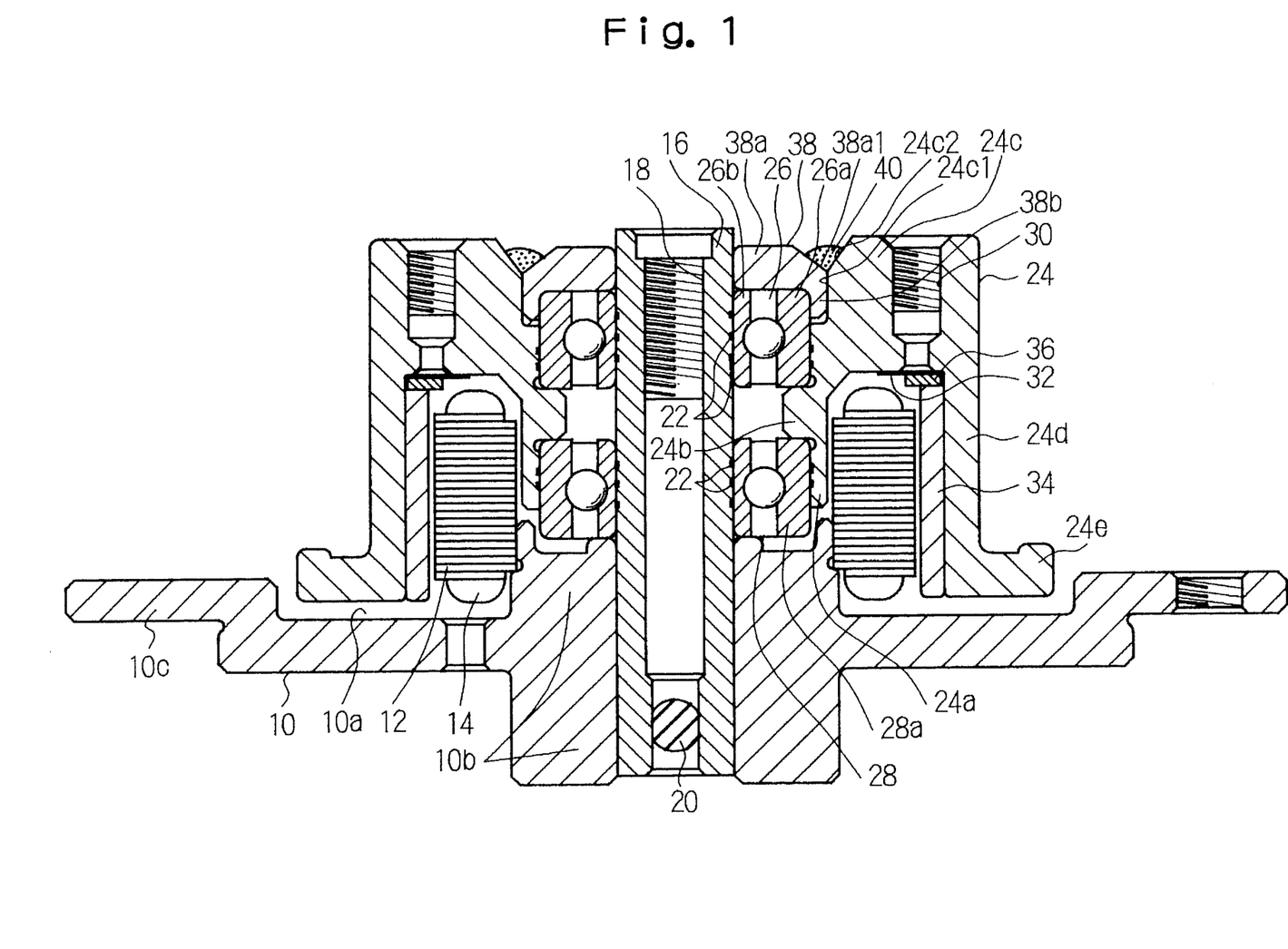
FIG. 1 is a cross sectional view of a spindle motor showing a first embodiment of the present invention.

Referring to FIG. 1, a spindle motor of the first embodiment of the present invention will now be explained. FIG. 1 is a cross sectional view of the spindle motor designed for a hard disk drive. It is known that spindle motors according to the present invention are equally applicable to drive other recording mediums or the like.

There is provided a bracket 10 having a vertically extending cylindrical portion 10b provided in the center of an upward opening annular recess 10a thereof and a flange portion 10c provided on the circumference of the annular recess 10a. The bracket 10 may alternatively be arranged integrally with a base of a hard disk drive apparatus. The lower part of a stator core 12 is fitted on to the upper part of the cylindrical portion 10b. The stator core 12 carries a stator coil 14 wound thereon. The cylindrical portion 10b accepts the lower part of a stationary shaft 16 of approximately tubular shape fitted therein by pressing. The stationary shaft 16 has a hollow center provided at an upper end with a thread 18 and at a lower end with a separate rubber ball 20 for sealing. The outer surface of the stationary shaft 16 has two groups of adhesive grooves 22 formed in the upper part thereof for holding an adhesive to bond ball bearings.

A rotor hub 24 incorporates a two-cylinder configuration having an inner wall 24a and an outer wall 24d. The rotor hub 24 is rotatably mounted to the stationary shaft 16 by two, upper and lower, ball bearings 26, 28 bonded to the upper part of the stationary shaft 16. More specifically, the inner wall 24a has an inwardly projecting positioning rib 24b which abuts and support sides the outer races 26a and 28a of respective upper 26 and lower ball bearings 28. The upper ball bearing 26 at least is finished with such precision that the outer side of its outer race 26a and the inner side of its inner race 26b are coaxial.

An uppermost portion 24c of the rotor hub 24 has screw holes 30 therein for tightening a clamp (not shown) to hold a set of hard disks (not shown) fitted on the outer wall 24d and seated on a flange portion 24e of the rotor hub 24. The lower openings of the screw holes 30 are closed with seal 32 bonded to the lower surface of the bottom portion 24c. The inner side 24c1 of the bottom portion 24c is slightly greater in radius than the inner side of the inner wall 24a. The bottom portion 24c is beveled at the upper inside corner forming a slope 24c2. The flange 24e extends outwardly from the lowermost portion of the outer wall 24d of the rotor hub 24 is accepted in the annular recess 10a of bracket 10.

A rotor magnet 34 of tubular shape is fixedly mounted to the inner side of the outer wall 24d of the rotor hub 24 so that it faces the stator core 12 at a very small radial distance. A spacer 36 is inserted between the seal 32 and the rotor magnet 34.

An annular sealing member 38 comprises a horizontal portion 38a and a hanger portion 38b provided radially downwardly of the portion 38a. The horizontal portion 38a is beveled at the upper outside corner forming a slope 38a1. In particular, the sealing member 38 is finished with such precision that the inner side of its hanger portion 38b and the inner side of its horizontal portion 38a are coaxial. Also, it is designated so that the clearance or fit between the outer side of the outer race 26a of the upper ball bearing 26 and the inner side of the hanger portion 38b of the sealing member 38 is minimum or optimum. The sealing member 38 is secured with its hanger portion 38b fitted closely onto the outer race 26a of the upper ball bearing 26. The inner side of the horizontal portion 38a of the sealing member 38 and the outer side of the stationary shaft 16 face each other at a very small radial distance or labyrinth gap. The stationary shaft 16 is finished so that the roundness of its outer surface is optimum at least where the inner race 26b of the upper ball bearing 26 is fitted and where the inner side of the horizontal portion 38a of the sealing member 38 is placed. The outer diameter of the hanger portion 38b is slightly smaller than the inner diameter of the inner side 24c1 of the bottom portion 24c of the rotor hub 24.

The sealing and bonding between the sealing member 38 and the rotor hub 24 is accomplished by applying an adhesive 40 along the slope 38a1 of the horizontal portion 38a of the sealing member 38 and the slope 24c2 of the bottom portion 24c of the rotor hub 24. The angle between the two slopes 38a1 and 24c2 is substantially obtuse thus to prevent the adhesive 40 from separating if the sealing member 38 is dislocated from the rotor hub 24 due to a difference in the thermal expansion.

Accordingly, in the spindle motor of the first embodiment, the hanger portion 38b of the sealing member 38 is directly fitted onto the high precision machined outer race 26a of the upper ball bearing 26 enhancing the alignment of the sealing member 38 and the stationary shaft 16 regardless of any finishing accuracy on the inner side of the rotor hub 24. More particularly, the horizontal portion 38a of the sealing member 38 is very closely fitted onto the stationary shaft 16 so that the radial distance therebetween (of e.g. 25 micrometers) is uniform and correct throughout their circumference. As the result, the sealing effect is increased effectively preventing the lubricant in the upper ball bearing 26 from escaping and impairing the hard disk unit. Also, steps for the production of the motor will be minimized in number thus increasing the productive efficiency.

In addition, a further labyrinth effect is achieved between the lower end of the inner wall 24b of the rotor hub 24 and the upper end of the cylindrical portion 10b of the bracket, between the outer side of the inner wall 24a and the inner side of the stator core 12, and between the lower and outer sides of the flange portion 24e of the rotor hub 24 and the bottom and inner wall of the annular recess 10a of the bracket 10 respectively, preventing lubricant in the lower ball bearing 28 or any other impurities from spilling out.

A spindle motor of the second embodiment of the present invention will now be described in details referring to FIG. 2.

Figure 2:
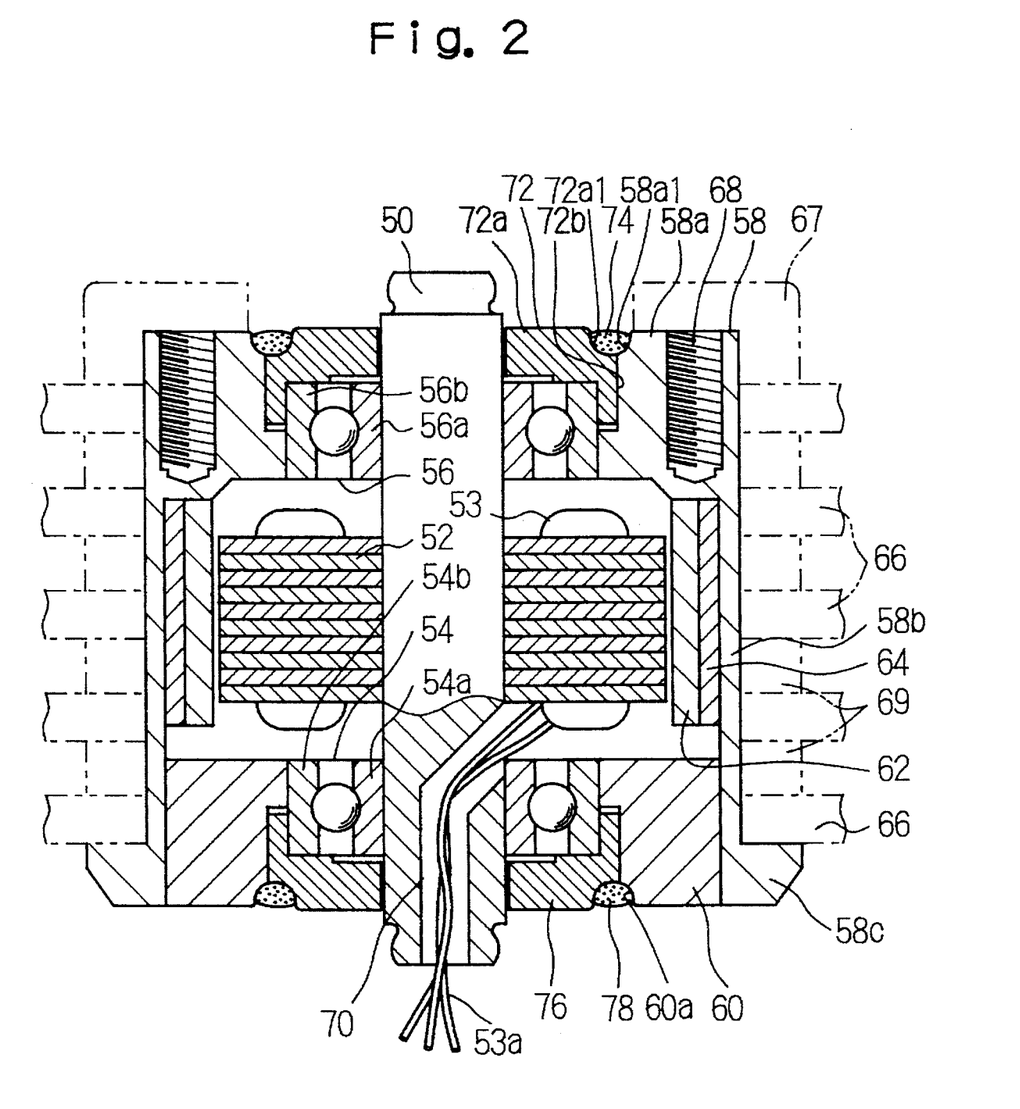
FIG. 2 is a cross sectional view of a spindle motor showing a second embodiment of the present invention.

FIG. 2 illustrates a spindle motor for a hard disk drive, in which a stationary shaft 50 of approximately column shape is vertically mounted on the base of a hard disk drive apparatus. A stator core 52 is fixed onto a center part of the stationary shaft 50 and carries a stator coil 53 wound thereon. Also, fitted onto lower and an upper parts of the stationary shaft 50 are the inner race 54a of a lower ball bearing 54 and the inner race 56a of an upper ball bearing 56 respectively.

A rotor hub 58 of inverted bowl shape includes a proximal portion 58a having an opening at the center and is rotatably mounted by the upper and lower ball bearings 56, 54 to the stationary shaft 50. More specifically, the rotor hub 58 is coupled at a lower end of annular wall portion 58b by an annular member 60 to the outer side of the outer race 54b of the lower ball bearing 54 and at the inner side of the proximal portion 58a to the outer side of the outer race 56b of the upper ball bearing 56. A rotor yoke 64 which holds a rotor magnet 62 therein is fitted into a wall portion 58b of the rotor hub 58. The rotor magnet 62 is spaced by a small radial gap from the stator core 52. The proximal portion 58a of the rotor hub 58 has screw holes 68 for tightening a clamp 67 to hold a set of hard disks 66 fitted onto the wall portion 58b and seated on a flange portion 58c of the rotary hub 58. The hard disks 66 are spaced from one another by a number of spacers 69. The stator coil 53 has lead lines 53a extending downwardly through a lead aperture 70 in the stationary shaft 50 communicating from the interior of the motor to the outside.

The inner side of the proximal portion 58a of the rotor hub 58 is slightly enlarged at an uppermost portion in a radial direction and is also beveled at an upper inside corner forming a J-shaped slope 58a1. Similarly, the inner side of the annular member 60 is slightly enlarged at a lowermost portion in a radial direction and is beveled at the lower inside corner forming a J-shaped slope 60a.

An annular upper sealing member 72 has a horizontal portion 72a and a hanger portion 72b provided outwardly and downwardly of the horizontal portion 72a. The hanger portion 72b is beveled at the upper outside corner forming a J-shaped slope 72a1. The upper sealing member 72 is finished with such precision that the inner sides of its horizontal portion 72a and hanger portion 72b are coaxial. Also, it is so arranged that the clearance or fit between the outer side of the outer race 56b of the upper ball bearing 56 and the inner side of the hanger portion 72b of the upper sealing member 72 is minimum or optimum. The inner side of the hanger portion 72b of the upper sealing member 72 is tightly fitted onto the outer side of the outer race 56b of the upper ball bearing 56. The inner side of the horizontal portion 72a of the upper sealing member 72 faces at a very small radial distance or labyrinth gap the outer side of the stationary shaft 50. Also, the roundness of the outer surface of the stationary shaft 50 is optimum at least where the inner race 56a of the upper ball bearing 56 is fitted and adjacent the inner side of the horizontal portion 72a of the upper sealing member 72. The outer diameter of the hanger portion 72b is slightly smaller than the inner diameter of the enlarged part of the proximal portion 58a of the rotor hub 58.

Adhesive 74 is applied to a groove of U shape in cross section defined between the slope 72a1 of the upper sealing member 72 and the slope 58a1 of the proximal portion 58a of the rotor hub 58. Thus, the sealing and bonding between the upper sealing means 72 and the proximal portion 58a of the rotor hub 58 is achieved with the adhesive 74. Since the angle between the two slopes 72a1 and 58a1 is obtuse, the adhesive 74 can be positively prevented from detaching if the upper sealing means 72 and the rotor hub 58 are dislocated from each other due to a difference in thermal expansion.

Accordingly, the spindle motor of the second embodiment allows the hanger portion 72b of the upper sealing member 72 to be very closely fitted onto the outer race 56a of the upper ball bearing 56 enhancing the alignment of the upper sealing member 72 to the stationary shaft 50 regardless of the finishing accuracy on the inner side of the rotor hub 58. More particularly, the horizontal portion 72a of the upper sealing member 72 and the outer surface of the stationary shaft 50 directly confront each other at a uniform, minimum radial distance throughout the shaft circumference. As a result, sealing effect is increased effectively preventing lubricant in the upper ball bearing 56 from escaping and impairing the hard disks or other components. Also, steps for the production of the motor are minimized in number thus increasing productive efficiency.

The arrangement of an annular lower sealing member 76, an annular member 60, and an adhesive 78 is implemented in the same manner as for the above described assembly of the upper sealing member 72, the proximal portion 58a of the rotor hub 58, and the adhesive 74, thus ensuring a similar effect.

A spindle motor of the third embodiment of the present invention will be described in detail referring to FIGS. 3 and 4.

Figure 3:
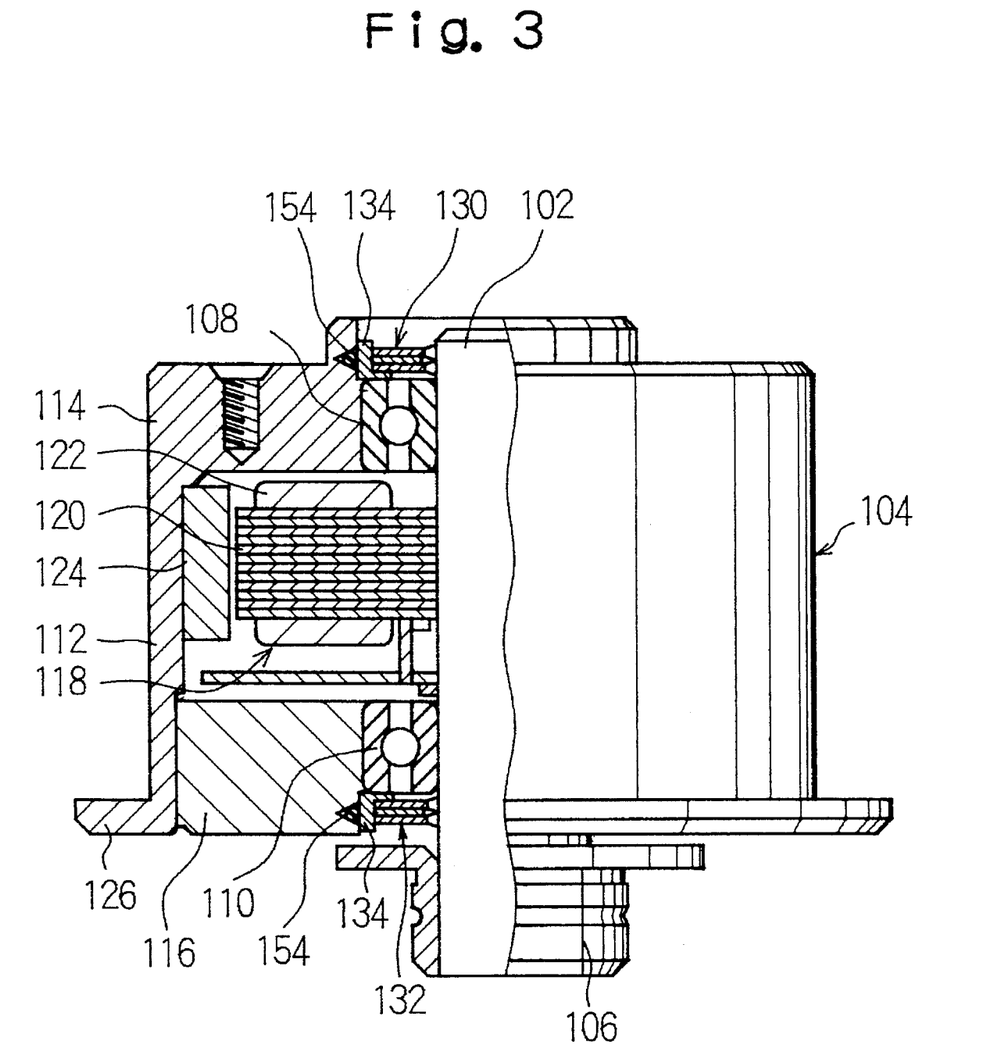
FIG. 3 is a partially cross sectional view of a spindle motor showing a third embodiment of the present invention.

As shown in FIG. 3, the spindle motor comprises mainly a stationary shaft 102 and a hub 104 arranged for rotation relative to the stationary shaft 102. A cup-like member 106 is fixed to a lowermost portion of the stationary shaft 102, which is coupled to a lower frame (not shown) of a disk drive apparatus.

Two ball bearings 108 and 110 are mounted to the ends of the stationary shaft 102 respectively, rotatably supporting the hub 104. The hub 104 comprises a cylindrical hub body 112, an end plate 114 mounted to one end of the hub body 112, and an annular support 116 mounted to the other end of the hub body 112. The end plate 114 is directly supported by the upper ball bearing 108 and the hub body 112 is supported via the annular support 116 by the lower ball bearing 110.

A stator 118 is mounted to an intermediate part of the stationary shaft 102 (between the two ball bearings 108 and 110), which comprises a stator core 120 fixedly mounted to the stationary shaft 102 and an armature coil 122 wound along a toothed side of the stator core 122. An annular rotor magnet 124 is mounted to the inner side of the hub body 112 opposite to and outwardly of the stator 118. The hub body 112 has at its open end a flange portion 126 provided on the outer side thereof for holding a plurality of recording disks (not shown), e.g. magnetic disks, which are arranged vertically at equal intervals.

Two magnetic fluid sealing means 130 and 132 are provided on the outside of the upper and lower ball bearings 108, 110 respectively, and are identical in construction. One of the two identical magnetic fluid sealing means 130, 132 will now be explained in more detail. As best shown in FIG. 4, the magnetic fluid sealing means 130 (132) comprises an annular L-shaped rack 134 and a magnetic fluid holder 136 mounted on the rack. The magnetic fluid holder 136 consists mainly of an annular permanent magnet 138 and a pair of annular pole pieces 140 and 142 sandwiching the permanent magnet 138. The rack 134 has a flange portion 144 extending radially inwardly thereof. The magnetic fluid holder 136 is supported on the flange portion 144 and securely bonded to the inner side of the rack 134.

The two magnetic fluid sealing means 130 and 132 are installed in the following manner. For installation of the magnetic fluid sealing means 130, its rack 134 is positioned on a shoulder provided on the inner side of the end plate 114 of the hub 104 and bonded at its outer side to the end plate 114. For installation of the other magnetic fluid sealing means 132, rack 134 is positioned on a shoulder provided on the inner side of the hub support 116 and bonded at its outer side to support 116. A magnetic fluid 146 of an appropriate type is applied to fill a clearance between the magnetic fluid holder 136 (more precisely, the two pole pieces 140 and 142) of each magnetic fluid sealing means 130 or 132 and the outer surface of the stationary shaft 102.

Accordingly, the two magnetic fluid sealing means 130 and 132 are placed in predetermined positions sealing up both ends of the spindle motor. As the result, grease in the ball bearings 108 and 110 and other impurities inside the motor will positively be prevented from escaping toward the outside.

In addition, the spindle motor of the third embodiment contains oil absorbing means arranged on the outside of the two ball bearings 130 and 132 respectively. The end plate 114 of the hub 104 has an annular recess 150 provided in the inner side thereof, close to the ball bearing 108. The hub support 116 has an annular recess 152 provided in the inner side thereof, adjacent to the other ball bearing 110. The two annular recesses 150 and 152 accommodate the oil absorbing means. The cross sectional shape of the two recesses 150 and 152 may be V-shaped as shown. The oil absorbing means may be selected from any of several oil absorbent materials including cellulose, foamed resin, and porous rubber. A preferable type of oil absorbing means is a ring-shaped resilient material 154 as shown. It is intended that the ring 154 be slightly compressed while the magnetic fluid sealing means 130 (or 132) is installed in its position and then, expanded to seal between the end plate 114 (or the support 116) of the hub 104 and the rack 134 of the magnetic fluid sealing means 130 (or 132).

In operation, when oil substance is separated from the grease in the ball bearing 108, it starts to flow outwardly from between the inner and outer races 156, 158, being driven by centrifugal force of the rotation hub 104. However, the rack 134 of the magnetic fluid sealing means 130 is very tightly fitted to the end plate 114 of the hub 104 and allows no portion of the oil substance to move toward the outside of the motor. In case the fit between the end plate 114 of the hub 104 and the rack 134 of the magnetic fluid sealing means 130 is degraded or becomes loose during service, a portion of the oil may move further into a gap between the same. Then, its flow will successfully be stopped by the oil absorbing means 154 accommodated in the recess 150 of the end plate 114 and prevented from running outwardly. The other side of the motor at the ball bearing 110 will act the same.

Figure 5:
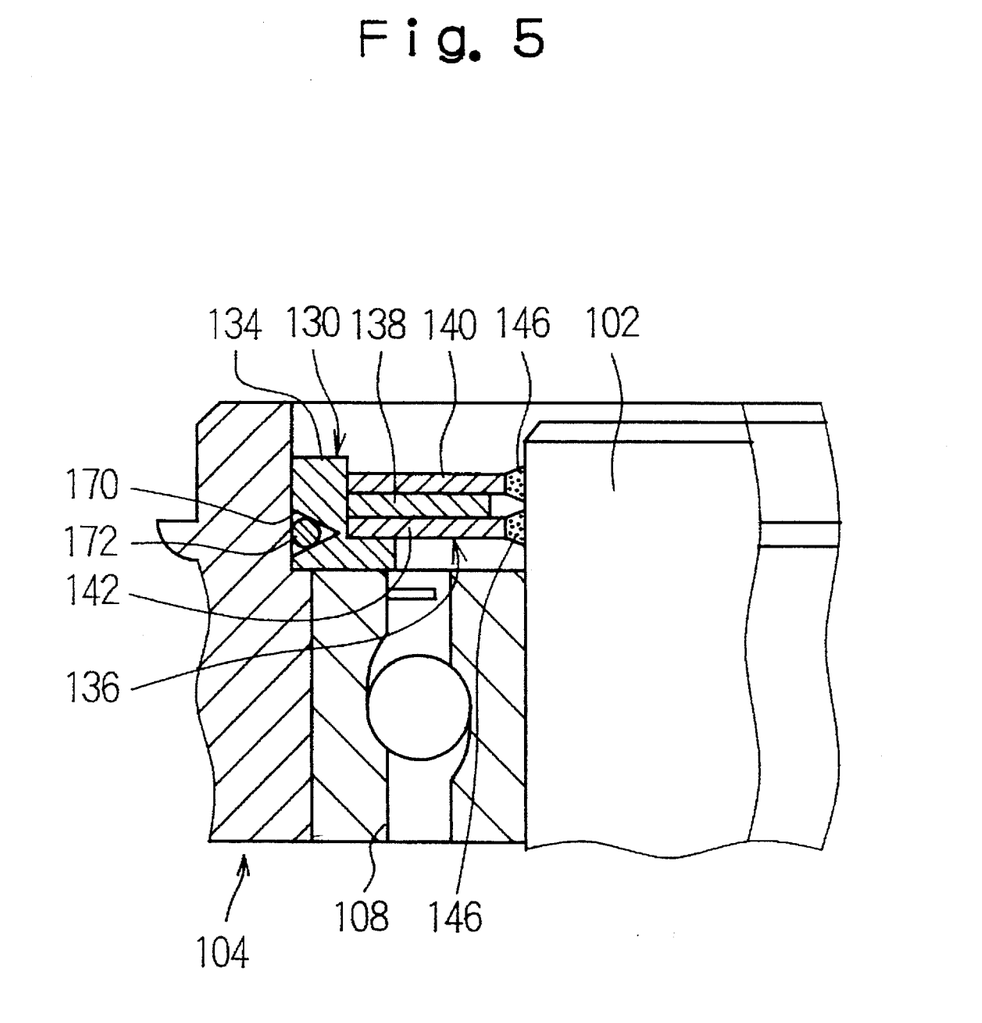
FIG. 5 is a cross sectional view of the sealing region of a modification of the spindle motor shown in FIG. 3.

FIG. 5 shows a modification of the third embodiment, in which the oil absorbing means is arranged on the rack 134 of the magnetic fluid sealing means 130. As shown, the modification is specifically applied to the ball bearing 108 side of the motor where the rack 134 of the magnetic fluid sealing means 130 has an annular recess 170 provided in the outer side thereof for accommodation of the oil absorbing means or ring absorbent material 172.

This modification also permits a portion of the oil substance escaped from the ball bearing 108 to be stopped and absorbed by the ring absorbent material 172, causing no oil leakage. Accordingly, the same effect as in the third embodiment of FIGS. 3 and 4 will be achieved with the modification.

Figure 4:
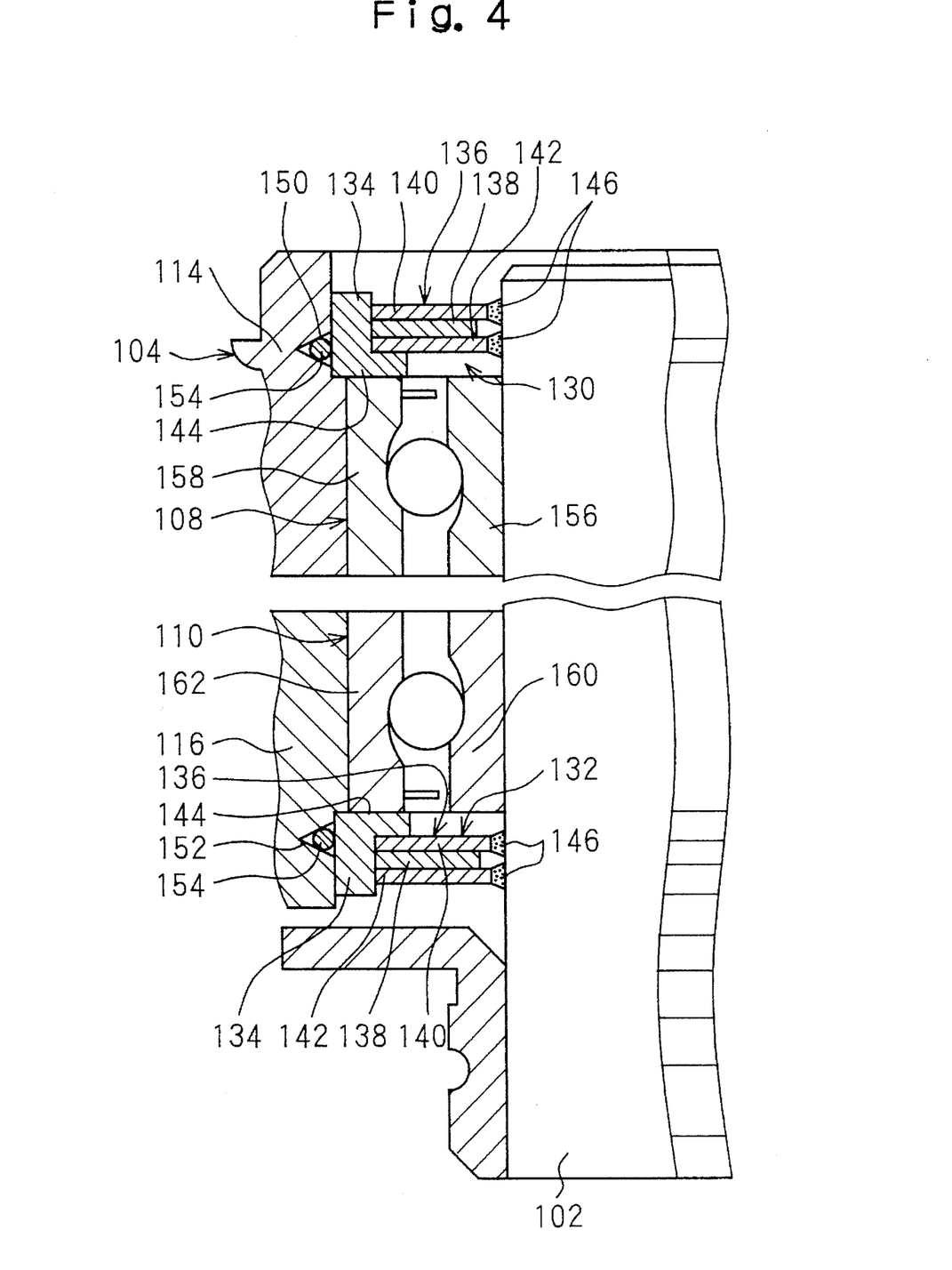
FIG. 4 is an enlarged cross sectional view of the sealing region of the spindle motor shown in FIG. 3.

Although a single ring of absorbent material 154 or 172 is disposed on the outside of the ball bearing 108 (110) according to the third embodiment of FIGS. 3 to 5, a plurality of rings may be arranged at proper intervals for absorption of more of the oil substance.

It will be understood that the present invention is not limited to the stationary-shaft type spindle motors of the foregoing embodiments where, for example, a hub 104 is rotated relative to a stationary shaft 102, but is also applicable to rotary-shaft type spindle motors with equal success. In a rotary-shaft type spindle motor, a hub is rotatably supported by a stationary base and more particularly, a rotary shaft mounted to the hub is mounted by ball bearings to the stationary base. The magnetic fluid holder of each magnetic fluid sealing means is therefore mounted to either the stationary base or the rotary shaft.

Although the third embodiment is described in the form of a spindle motor having the magnetic fluid sealing means 130 and 132 disposed outwardly of the ball bearings 108 and 110 respectively, its scheme is applicable to another type of spindle motor where a labyrinth sealing arrangement or cap sealing means is employed.

A spindle motor of the fourth embodiment of the present invention will now be described referring to FIG. 6. As will be apparent, like components are denoted by like numbers as those shown in FIG. 3 and 4 for ease of explanation.

The spindle motor of the fourth embodiment employs a specific arrangement for preventing separated oil in two ball bearings 108 and 110 from flowing toward the outside. In the arrangement, the annular rack 134 of a magnetic fluid sealing means 130 (or 132) has an annular trap recess 180 provided in the outer side thereof at the outside of the ball bearing 108 (or 110). The trap recess 180 is slightly wider at the opening. Also, its lower (or upper) edge extends horizontally and its upper (or lower) edge is moderately tilted downwardly toward its innermost end, as shown in FIG. 6. The trap recess 180 communicates at its innermost end with a plurality of small storage channels 182 one shown in FIG. 6) arranged at intervals in a circumferential direction. The storage channels 182 extend from the trap recess 180 to the upper end of the ball bearing 108 (or 110) for receipt and storage of escaped oil. Four of the storage channels 182 are adequate to store an escaped portion of the liberated oil. A larger number of storage channels 182 may be provided if required for holding additional oil.

In operation, when an oil substance is separated from the grease in the ball bearing 108, it tends to flow outwardly from between the inner and the outer races 156, 158 of the ball bearing, 108 being driven by centrifugal force. Since the annular rack 134 of the magnetic fluid sealing means 130 is tightly fitted against an end plate 114 of the hub 104, no portion of the oil substance runs further and is thus prevented from leaking out of the motor. If the fit between the rack 134 and the hub plate 114 is degraded or becomes loose, a portion of the oil substance may run outwardly from between the rack 134 of the magnetic fluid sealing means 130 and the outer race 158 of the ball bearing 108 to between the rack 134 and the end plate 114 of the hub 104. However, before reaching the outward end of the annular rack 134, it is trapped by the trap recess 180 and then, drawn by means of capillary action into the storage channels 182 where it is stored. As the result, leakage of the separated oil will be definitely avoided. The other side of the motor at the ball bearing 110 will provide the same effect.

Figure 7:
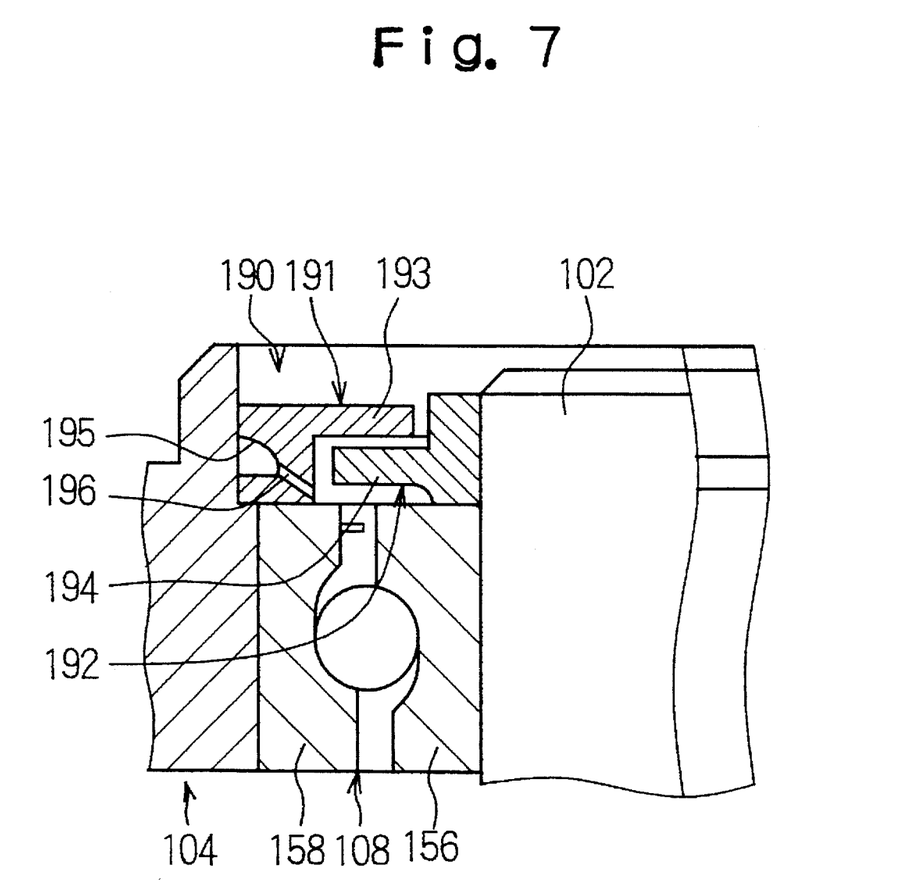
FIG. 7 is a cross sectional view of the sealing region of a modification of the spindle motor shown in FIG. 6.

FIG. 7 illustrates a modification of the fourth embodiment where the magnetic fluid sealing means is replaced with a labyrinth sealing means 190. The labyrinth sealing means 190 comprises a first member 191 mounted to a hub 104 and a second member 192 mounted to a shaft 102. More specifically, the first member 191 is bonded by an adhesive directly on a shoulder provided on the inner side of the hub 104 and the outer race 158 of a ball bearing 108. The first member 191 has a flange portion 193 thereof extending radially inwardly. The second member 192 is also bonded by adhesive and is seated directly on the inner race 156 of the ball bearing 108. Similarly, the second member 192 has a flange portion 194 thereof extending radially outwardly. The flange portion 193 of the first member 191 and the flange portion 194 of the second member 192 are relative to each other at a very small interval axially of the motor, forming in combination a labyrinth sealing construction. An annular trap recess 195 similar to the above described is also provided in the outer side of the first member 191, communicating at its innermost end with a plurality of small storage channels 196 (one shown in FIG. 7) arranged at given intervals in the circumferential direction. The storage channels 196 extend from the trap recess 195 through the first member 191 to the upper end of the ball bearing 108.

As apparent, an escaped portion of oil substance from between the inner and the outer races 156, 158 of the ball bearing 108 runs outwardly driven by centrifugal force and if the coupling between hub 104 and the first member 191 of the labyrinth sealing means 190 is degraded or becomes loose, tends to flow further from between the outer race 158 and the first member 191 between the hub 104 and the first member 191. This modification like the original arrangement of the fourth embodiment allows the escaped portion of the oil to be intercepted by the annular trap recess 195 of the first member 191 and drawn by capillary action into the storage channels 196 for storage. The advantage of the modification is hence identical to that of the fourth embodiment shown in FIG. 6.

Figure 6:
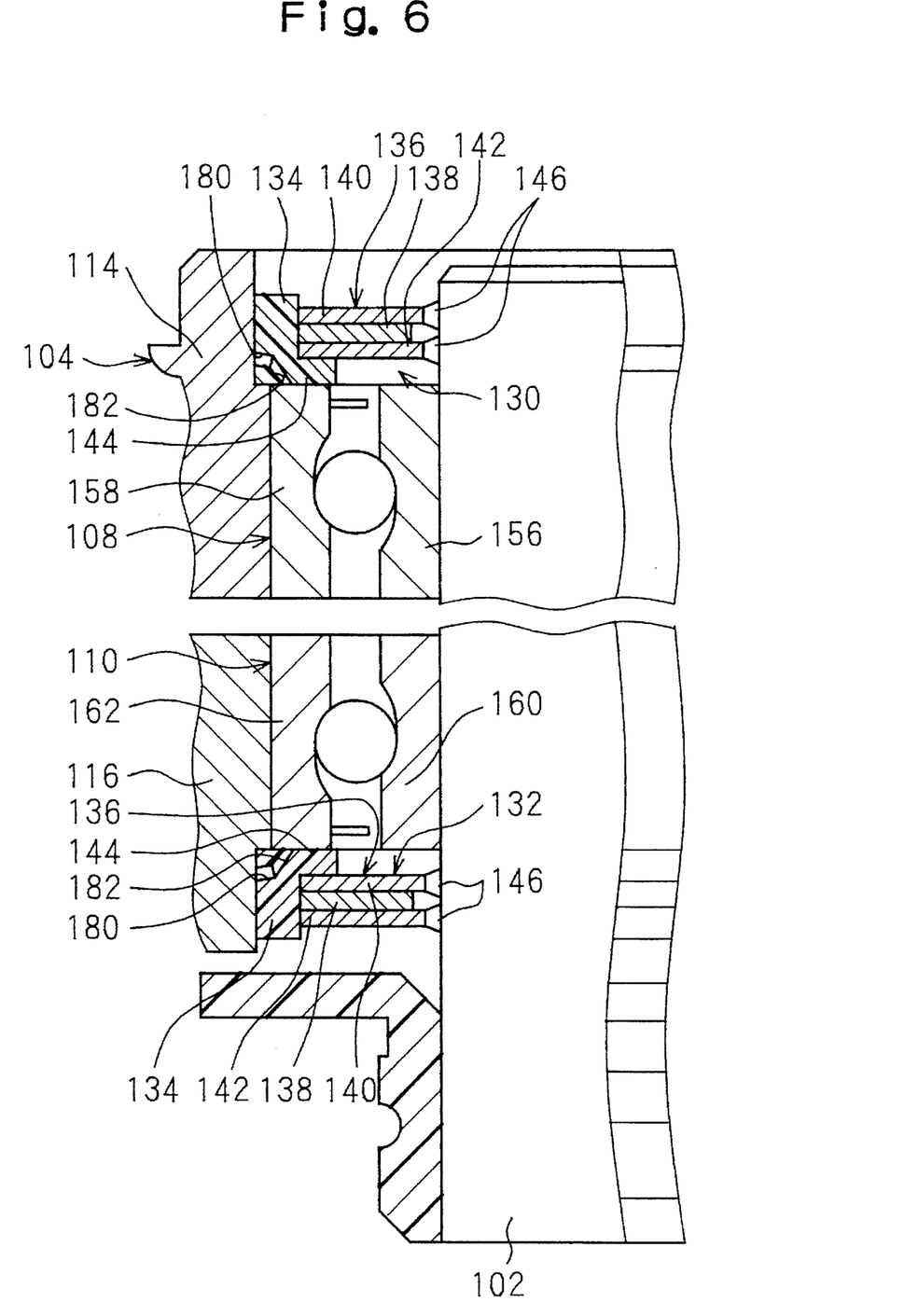
FIG. 6 is a cross sectional view of a spindle motor showing a fourth embodiment of the present invention.

Although a single annular trap recess 180 (195) is formed in the annular racks 134 of the magnetic fluid sealing means 130 and 132 (or the first member 191 of the labyrinth sealing means 190) according to the fourth embodiment of FIG. 6 (and 7), a plurality of the same may be arranged at proper intervals for absorption of additional amounts of escaped oil substance. (Also, a greater number of storage channels may be provided in that connection.)

It will also be understood that the spindle motor of the fourth embodiment is not limited to stationary-shaft type spindle motors where the hub 104 rotates relative to the stationary shaft 102 but may be employed with a rotary-shaft type motor with equal success.

Figure 8:
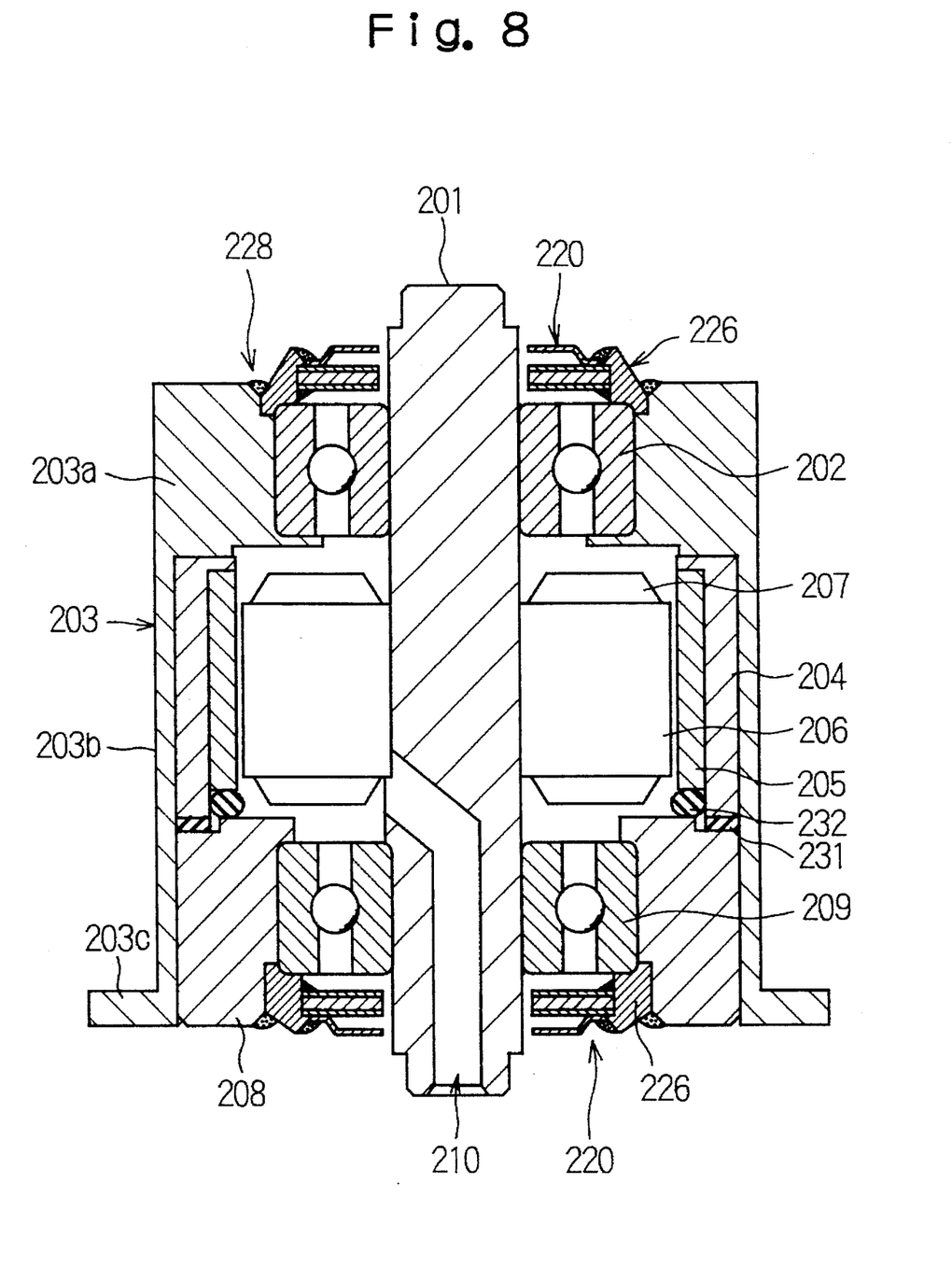
FIG. 8 is a cross sectional view of a spindle motor showing a fifth embodiment of the present invention.

A spindle motor of the fifth embodiment of the present invention will be described in detail referring to FIGS. 8 and 9.

As shown, the spindle motor of the fifth embodiment is for rotating disks in a hard disk drive apparatus and stationary shaft 201 is fixedly mounted to a base or motor bracket of the apparatus. A hub 203 is rotatably mounted by an upper ball bearing 202 to the outer surface of the stationary shaft 201. The hub 203 has an inverted-U shape in cross section and contains a magnet 205 mounted by a yoke 204 to the inner side thereof. The hub 203 comprises a proximal portion 203, an extended portion 203b hanging vertically from the outer edge of the proximal portion 203a, and a flange portion 203c provided at the lower end of the extended portion 203b. A plurality of magnetic disks are installed and supported by the flange portion 203c. A stator core 206 is mounted on the outer surface of the stationary shaft 201 so that it faces the magnet 205 on the hub 203. The stator core 206 has a coil 207 wound thereon. An annular bushing 208 is mounted to the inner side of the extended portion 203b of the hub 203 and coupled by a lower ball bearing 209 to the stationary shaft 201. The stationary shaft 201 has a through hole 210 provided therein for extending lead lines which energize the coil 207.

Magnetic fluid sealing means 220 are disposed at the upper and lower ends of the stationary shaft 201 respectively. As illustrated in FIG. 8, the two sealing means 220 are substantially identical in construction although one is located between the hub 203 and the stationary shaft 201 and the other between the bushing 208 and the shaft 201. The upper sealing means between the hub 203 and the shaft 201 only will be explained.

Figure 9:
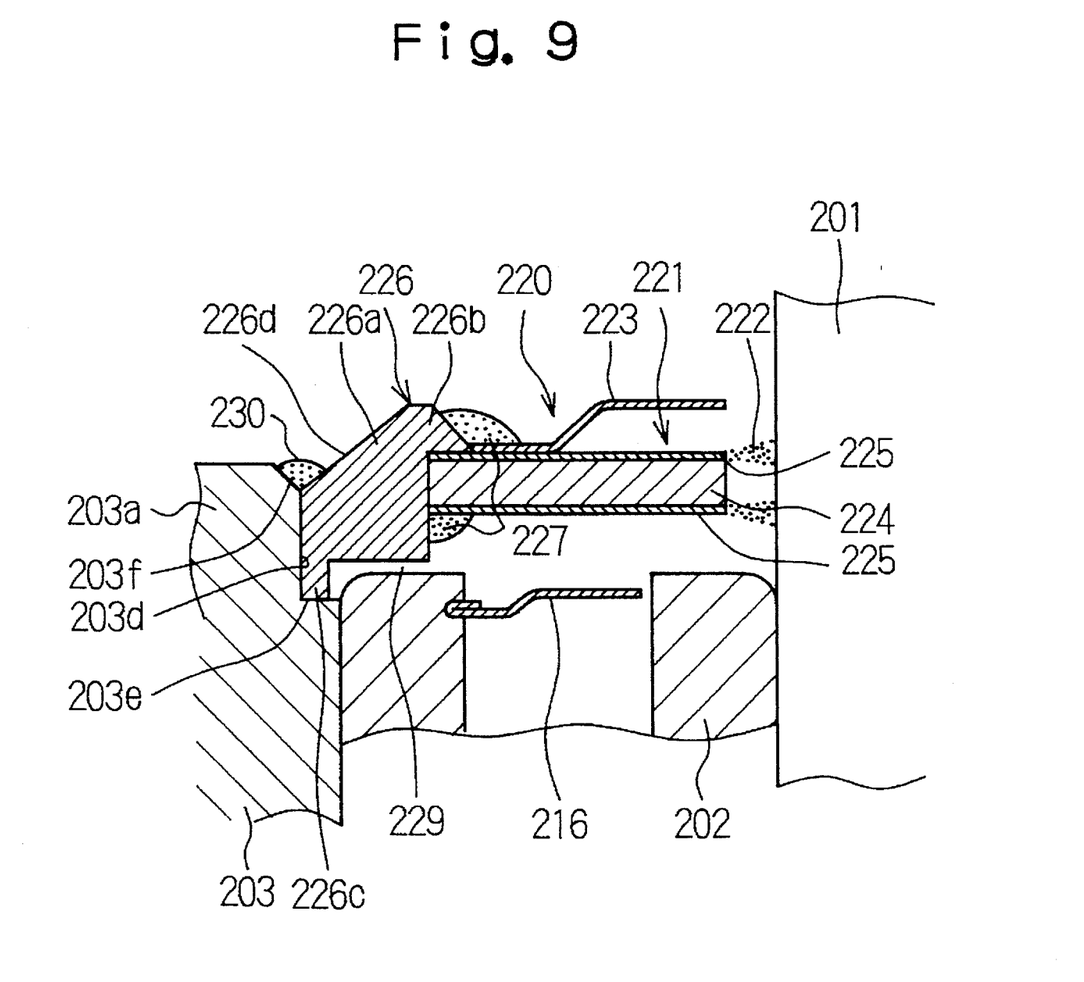
FIG. 9 is a partially cross sectional view of the sealing region of the spindle motor shown in FIG. 8.

FIG. 9 shows an enlarged view of the upper magnetic fluid sealing means 220 which comprises a ring-like magnetic plate 221, a magnetic fluid 222 held at one end of the magnetic plate 221, and a ring-like protective cap 223 mounted outwardly of the magnetic plate 221. The magnetic plate 221 comprises an annular spacer 224 and a pair of magnetic pole plates 225 sandwiching the spacer 224.

The magnetic plate 221 and the protective cap 223 of the magnetic fluid sealing means 220 are supported by an annular bushing 226 of substantially a triangular shape in cross section. The annular bushing 226 comprises a main body 226a, an annular rib 226b projecting from the upper inner side of the main body 226a, and an annular projection 226c projecting downwardly from the lower side edge of the main body 226a. The main body 226a is beveled at the upper outside corner forming a tapered surface 226d.

The hub 203 also has an annular step 203e and a tapered surface 203f arranged at the upper inside corner of the proximal portion 203a which has at its center an opening 203d for accommodating the upper ball bearing 202. For installation of the magnetic fluid sealing member 220 to the annular bushing 226, its upper magnetic plate 221 is placed from below against the lower side of the rib 226b and its protective cap 223 is seated in a coaxial position on the upper magnetic plate 221. Then, adhesive 227 is applied to bond those components together.

In succession, the projection 226c of the annular bushing 226 is placed on the step 203e of the proximal portion 203a of the hub 203. As a result, the tapered surface 226d of the bushing 226 meets at its lowermost portion the lower edge of the tape surface 203f of the hub 203, forming substantially a 90° V-shaped space therebetween to which ultraviolet ray is irradiated. Simultaneously, a very small clearance or labyrinth gap 229 is created between the upper side of the outer race of the ball bearing 202 and the lower side of the annular bushing 226. When the V-shaped space 228 has been filled with ultraviolet curing adhesive 230 and followed by irradiation of ultraviolet rays, the annular bushing 226 is secured to the hub 203.

Rubber rings 231 and 232 of annular shape are inserted between the yoke 204 and the bushing 208 and between the magnet 205 and the bushing 208 respectively. Due to the resiliency of the rubber rings 231 and 232, both the yoke 204 and the magnet 205 are secured to the hub 203 with no use of adhesive. More specifically, the yoke 204 and the magnet 205 are fitted into the hub 203 without adhesive since they are urged by the recovering force of the rubber rings 231 and 232 against the lower side of the proximal portion 203a of the hub 203. Accordingly, no application of adhesive is needed thus preventing unwanted events, e.g. decrease in the bonding strength or bleeding due to immature curing of the adhesive. Also, the process for production has no curing time and will be increased in efficiency.

In operation, if a gas of lubricant escaped from the ball bearing 202 passes a shielding plate 216 mounted to the outer race of the bearing 202, it is eventually trapped by the labyrinth gap 229 between the ball bearing 202 and the annular bushing 226. There will thus be less possibility of allowing an escaped portion of the lubricant to move into a disk chamber above.

Furthermore, if the escaped portion of the lubricant passes through the labyrinth gap 229, it will be blocked by the downwardly extending projection 226c of the annular bushing 226 disposed at the end of the labyrinth gap 229. Thus, almost no portion of the lubricant can enter the disk chamber above the motor.

According to the fifth embodiment, the two tapered surfaces 226d and 203f of the annular bushing 226 and the hub 203 respectively confront each other as the annular bushing 226 remains seated on the step 203e of the hub 203, forming the V-shaped space 228 therebetween. Thus, the adhesive 230 filled in the space 228 can explicitly be exposed to the irradiation of ultraviolet rays for ease of the curing action.

It should be understood that the present invention is not limited to the spindle motors of the above described embodiments and various modifications and changes are possible without departing the scope of the present invention.

We claim:

1. A spindle motor comprising;

a stationary shaft;

a rotor hub rotatably mounted to the stationary shaft;

an upper ball bearing and a lower ball bearing provided between the stationary shaft and the rotor hub and rotatably supporting the rotor hub to the stationary shaft;

an annular rotor magnet mounted to the rotor hub;

a stator mounted in radial opposition to the rotor magnet;

each ball bearing having an inner race and an outer race, an inner surface of the inner race of the upper ball bearing being fixedly mounted to an outer surface of the stationary shaft, an outer surface of the outer race of the upper ball bearing, at least a lower portion of being fixedly mounted to an inner surface of the rotor hub, an annular sealing member forming a labyrinth seal with the stationary shaft disposed outwardly and above the upper ball bearing, the sealing member comprising a disk-shaped horizontal portion having a cylindrical inner surface confronting the outer surface of the stationary shaft, and an annular extending portion extending downwardly from the outer surface of the horizontal portion, the sealing member being loosely mounted to the rotor hub but the inner surface of the extending portion being in direct and tight radial mounting contact with the radially outwardly disposed surface of the outer race of the upper ball bearing, and the rotor hub has integral adjoining parts, one being directly fitted unto and about a lower part of the outer race of the upper ball bearing and the other being formed with a greater inner diameter than the former part, the extending portion of the sealing member being inserted into the annular opening defined by the latter part, and the outer surface of the horizontal portion and the outer surface of the extending portion of the sealing member being in contact with the inner surface of the latter part.

2. A spindle motor according to claim 1, wherein the horizontal portion and the hanger portion of the sealing member are coaxial at their inner sides.

3. A spindle motor according to claim 1, wherein the sealing member is coupled to the rotor hub by an adhesive.

4. A spindle motor according to claim 3, wherein the sealing member is beveled at the upper outside corner forming a sloped surface and the rotor hub is beveled at the upper inside corner forming a sloped surface, the two sloped surfaces confronting each other to hold the adhesive therebetween.

5. A spindle motor according to claim 4, wherein the two sloped surfaces of the sealing member and the rotor hub are joined at an obtuse angle.

6. A spindle motor according to claim 5, wherein the adhesive is of an ultraviolet curing type.

* * * * *

UNITED STATES PATENT AND TRADEMARK OFFICE
CERTIFICATE OF CORRECTION

PATENT NO. : 5,596,235
DATED : Jan. 21, 1997
INVENTOR(S) : Asao Yazaki

It is certified that error appears in the above-indentified patent and that said Letters Patent is hereby corrected as shown below:

On the title page, item [75] Inventor: should read
Asao Yazaki, Iida-shi, Japan

Signed and Sealed this

Twenty-fourth Day of June, 1997

Attest:

BRUCE LEHMAN

*Attesting Officer*  *Commissioner of Patents and Trademarks*